Oct. 1, 1957　　　J. B. BRENNAN　　　2,808,493
WELDING OF TUBES AND THE LIKE
Filed Oct. 11, 1954　　　3 Sheets-Sheet 1
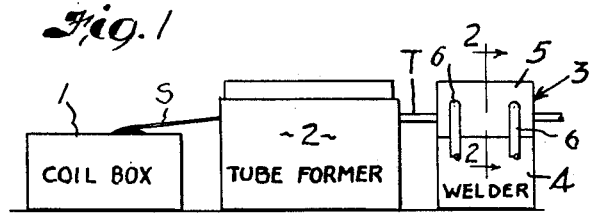
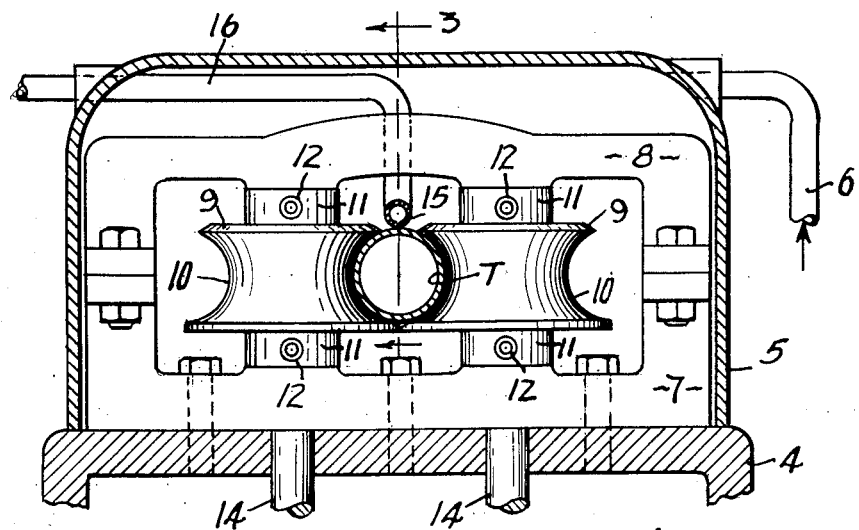
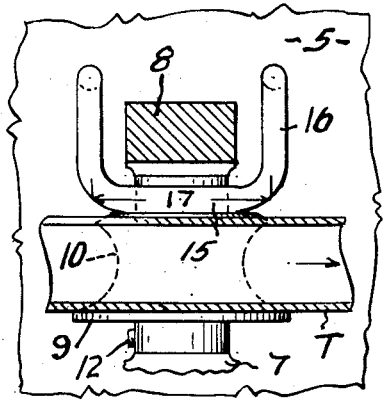
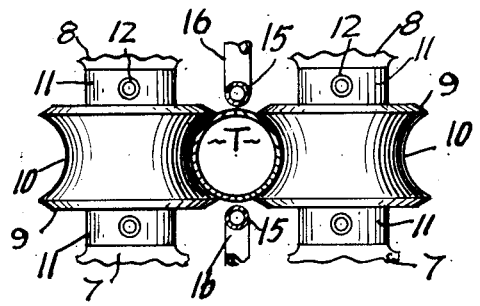
INVENTOR.
JOSEPH B. BRENNAN
BY
Oberlin & Limbach
ATTORNEYS.

Oct. 1, 1957     J. B. BRENNAN     2,808,493
WELDING OF TUBES AND THE LIKE

Filed Oct. 11, 1954     3 Sheets-Sheet 2

INVENTOR.
JOSEPH B. BRENNAN
BY
Oberlin & Limbach
ATTORNEYS.

Oct. 1, 1957   J. B. BRENNAN   2,808,493
WELDING OF TUBES AND THE LIKE
Filed Oct. 11, 1954   3 Sheets-Sheet 3

INVENTOR.
JOSEPH B. BRENNAN
BY
Oberlin & Limbach
ATTORNEYS.

2,808,493

WELDING OF TUBES AND THE LIKE

Joseph B. Brennan, Cleveland, Ohio

Application October 11, 1954, Serial No. 461,459

5 Claims. (Cl. 219—9.5)

The present invention relates generally as indicated to the welding of tubes and the like, and is a continuation in part of my copending application Serial No. 44,305, filed August 14, 1948, now Patent No. 2,691,208, dated October 12, 1954.

The aforesaid copending application relates to the method and apparatus for continuously laminating two bondable strips of metal together to form a composite metal strip such as is used in the manufacture of bearings composed of a steel backing strip having bonded or welded thereto a bearing alloy metal strip which may be of, for example, bronze, copper, silver, and alloys thereof.

In essence, the copending application covers the method of and apparatus for pressing together two metal bondable strips having their juxtaposed faces superficially heated to bonding or welding temperature while the remaining portions of the thicknesses of the respective strips are maintained at considerably lower temperature so as to retain the original chemical or physical properties thereof.

With the foregoing in mind, it is one principal object of this invention to provide a novel method and apparatus for welding strip metal in edge-to-edge relation as in the case of the welding of the seam or seams of tubing, the welding of the seams of split bushings, the welding together of flat metal strips, with or without scarfed edges in edge-to-edge relation to form either tubing of polygonal cross-section or wide strips of the same or different metals of width equal to the sum of the individual widths of the strips thus joined.

Another object of this invention is to provide a welding method and apparatus which employs high frequency induction heating means so disposed that the heating current is applied to the seam or seams after the adjoining edges have been abutted together as distinguished from prior methods wherein the edge portions of a tubular blank formed of strip metal are first heated to welding temperature and then are pressed together.

Another object of this invention is to provide a method and apparatus of the character indicated in which the heating to welding temperature is restricted to a very narrow zone adjacent the abutted seam edges while the remaining portion or portions of the strip metal are maintained at sufficiently low temperatures so as not to affect either the chemical or physical properties thereof.

Another object of this invention is to provide a method and apparatus for uniting a metal strip and applied layer of finely divided metal particles by fusing the particles and superficially heating the face of the strip to which the particles are applied to bonding temperature.

Broadly stated, the present method, insofar as the welding of tube, for example, is concerned, involves the bringing together of the seam edges of the tube into abutting engagement and passing the tube through a high frequency induction heating field which is so located as to concentrate the heating currents at the abutted seam edges only while the remaining body of the tube is subjected to cooling action and thus maintained at a temperature considerably less than welding temperature.

In the case of polygonal tubes formed of a plurality of metal strips brought together in edge-to-edge contact, the passage thereof through a high frequency induction heating coil effects concentrated heating only at the corners of the tube which are closer to the surrounding coil than the sides.

Insofar as the apparatus is concerned, the same may be broadly stated as comprising means for pressing together the seam edges or faces to be welded and high frequency induction heating means so located with respect to the pressing means that the seam edges or faces are heated to welding temperature while being urged or pressed together, the pressing means serving to press the heated seam edges together and at the same time to maintain the rest of the body of the tube or other article being welded at a much lower temperature to prevent change of chemical or physical properties of the strip metal involved.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

Fig. 1 is a schematic diagram showing a coil box for a coil of strip metal, a tube former for continuously forming the strip metal into tubing, and a welder for continuously welding the seam edges of the tube thus formed by the former;

Fig. 2 is a cross-section view of the welder taken substantially along the line 2—2, Fig. 1;

Fig. 3 is a fragmentary cross-section view, also of the welder, taken substantially along the line 3—3, Fig. 2;

Fig. 4 is a view generally similar to Fig. 2 except showing the formation of tubing by welding together two strips, each formed to semi-cylindrical cross-section;

Figure 5:
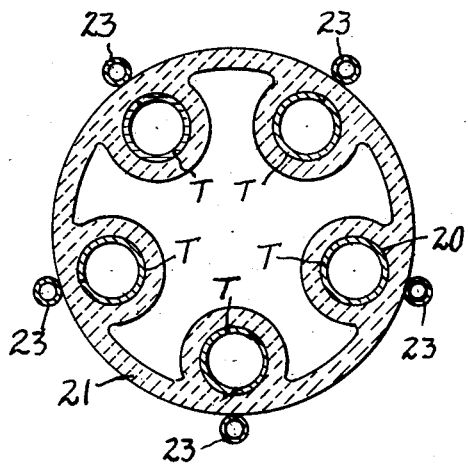
Fig. 5 is a cross-section view of a welder which accommodates a plurality of tubes formed from strip metal and adapted to have their seam edges welded together.

Referring now more particularly to the drawings, and first to Fig. 1, the strip metal S in coil form is rotatably supported as in the coil box 1. The end of the strip metal S is introduced between power-driven rolls (not shown) of a tube former 2, and as the strip metal S passes through successive pairs of rolls, it is progressively formed to final tubular form T. The tube T thus formed then passes through the welder 3 for welding together of the seam edges thereof. The welded tube T as it continuously issues from the welder 3 may then be subjected to any desired further treatment such as cooling, if necessary, straightening, cutting into predetermined lengths, coiling, etc., with which the present invention is not concerned.

Referring now to Figs. 2 and 3, the welder proper comprises a base 4 provided with a hood or cover 5 which preferably is substantially closed at its opposite ends except for openings for entry and emergence of the tube T. Connected to the hood is a pair of conduits 6 for circulating a suitable inert, neutral, de-oxidizing or non-oxidizing gas so that the proper atmosphere can be maintained around the abutted seam edges of the tube T during the welding operation.

Mounted on said base 4 is a support unit 7—8 which journals a pair of rolls 9, 9 each having a peripheral groove 10 corresponding to the cross-section of the tube T to be engaged thereby, in this case the peripheral grooves 10 being substantially semi-circular in cross-section but leaving a slight gap therebetween exposing the abutted seam edges of the tube T. The rolls 9, 9 are hollow for circulation therethrough of a coolant such as cold water. The hollow shafts of said rolls 9, 9 fit in swivel bodies 11 which are fixed against rotation and which have ports 12 for connection of water pipes. The lower ends of the shafts 14 may be solid as shown, and extend downwardly through the base 4 and have connected thereto suitable drive means, whereby the rolls 9, 9 may be driven at variable speeds.

The roll support assembly 7—8 preferably comprises the two parts 7 and 8, as shown, which may be readily separated for easy replacement of the rolls 9, 9 to accommodate different diameters of tube T.

Extending lengthwise above the seam of the tube T at the zone where the seam edges are pressed together into abutting engagement is a portion 15 of a water-cooled high frequency inductor 16, said portion 15 being located as close as practicable to the seam to reduce the air gap to a minimum. In some instances, this portion 15 of the high frequency inductor 16 may be embedded in or at least partially coated or surrounded with a ceramic material such as fused quartz or fused $Al_2O_3$ or fused $ZrO_2$ so that it may ride on or set against the seam to serve the additional function of smoothing the welding flash which otherwise might be formed on the outside of the tube T.

As evident, the heating current will be concentrated at the abutted seam edges of the tube T and at the zone where the rolls are extracting heat from the remaining section so that only the seam edges will be heated to welding temperature and simultaneously pressed together by the rolls to complete the tube T without disturbing the chemical or physical properties of the remaining body portion of the tube adjoining the seam edges.

It will be, of course, apparent that, instead of rolls 9, 9, one may employ longitudinally extending resilient pressing or clamping shoes provided with longitudinally extending semi-circular grooves which are in heat-exchange relation with the entire side wall of the tube except right at the welding zone. In this case, the shoes would be of longitudinal extent substantially the same or greater than the longitudinal extent of the effective portion 15 of the high frequency heating tube or inductor 16.

As a specific example, 9¼" wide by .062" thick strip metal S of steel was formed into tubing of 3" O. D. The tube T thus formed was passed at the rate of 30 ft. per minute with the seam edges tightly pressed together beneath an inductor of ½" diameter cross-section and 18" length, as indicated by the dimension line 17 in Fig. 3.

The space between the underside of the inductor portion 15 and the top of the tube was about ⅛" and, when the inductor 16 was connected to a 100 kva. generator, 9600 cycles per second, the tube T was securely welded without objectionable external or internal flash, and upon microscopic examination of the cross-section of the welded tube, the welding heat had progressed only about ½" circumferentially from the abutting seam edges. In the present example, the rolls for pressing the seam edges together were of 6" diameter and made of ceramic material, namely, $Al_2O_3$ with water at 65° F. continuously circulated therethrough at a rate of 3 gal. per minute each to maintain the same at approximately 200° F. during the continuous operation of the welder. The tube T as it emerged from the welder at the rate of 30 ft./min. was at a temperature of about 350° F.

Referring now to Fig. 4, the structure there shown is substantially the same as that in Figs. 2 and 3 except that a second high frequency inductor 16 is provided to effect heating to welding temperature of the other seam of the tube T which is herein made up of two metal strips each formed to semi-cylindrical cross-section. It has been found that, in working with certain strip metals such as aluminum and steel, it is preferred to form the same to semi-cylindrical cross-section rather than full cylindrical cross-section, because this can be done with simple inexpensive apparatus and a single pass.

Moreover, the forming apparatus while duplicated may be of considerably simpler form and often it is possible to completely form the semi-cylindrical sections by passage through only a single pair of forming rolls, whereas in a precision tube former, there may be five, six, or more sets of forming rolls effective to progressively form the flat strip into a complete tube having abutting seam edges.

In Fig. 5 is illustrated in cross-section an apparatus for simultaneously welding together the abutting seam edges of a plurality of tubes T formed of strip metal. In this case, the unwelded tubes pass through a corresponding number of circularly arranged openings 20 in a fluid-cooled ceramic die 21 of $Al_2O_3$ with the abutting seam edges disposed toward or outside the periphery of the die.

Opposite each tube seam is a high frequency inductor 23 which again, as already described, is effective to concentrate the heating current right at the abutted seam edges of the respective tubes, whereupon the tubes are welded without any appreciable heating of the bodies thereof except at the very edges of the seams.

It will be apparent that, instead of continuously passing tubes through the fluid-cooled die 21, the die may be in the form of a table having sockets 20 for receiving split tubular bushings composed of cold rolled steel, for example, and set in the respective sockets with their seam edges pressed together and facing outwardly in close proximity to the adjacent inductors 23.

Figure 6:
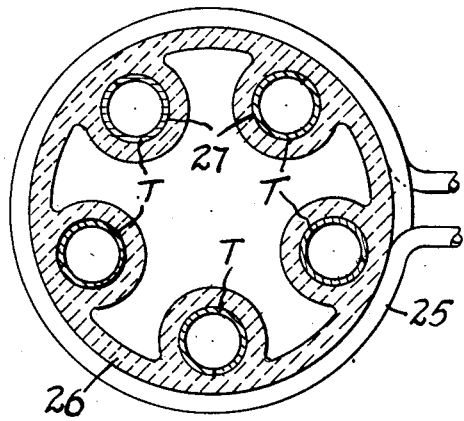
Fig. 6 illustrates a welder similar to that of Fig. 5 except that the high frequency induction heating means is in the form of a coil surrounding the cluster of tubes which pass through the welder with the seam edges thereof pressed together in abutting engagement.

The Fig. 6 apparatus is substantially the same as that illustrated in Fig. 5, and as described above, except that the high frequency induction heater 25 is in the form of a coil having a desired number of turns around the fluid-cooled ceramic die 26. Again, as in the apparatuses described, the high frequency welding currents are concentrated at the outwardly facing and abutting seams of the tubes T (or bushings) passing (or located) in the openings 27 of the die 26 while the remaining portions thereof are maintained in a cooled state much below welding temperature.

Figure 7:
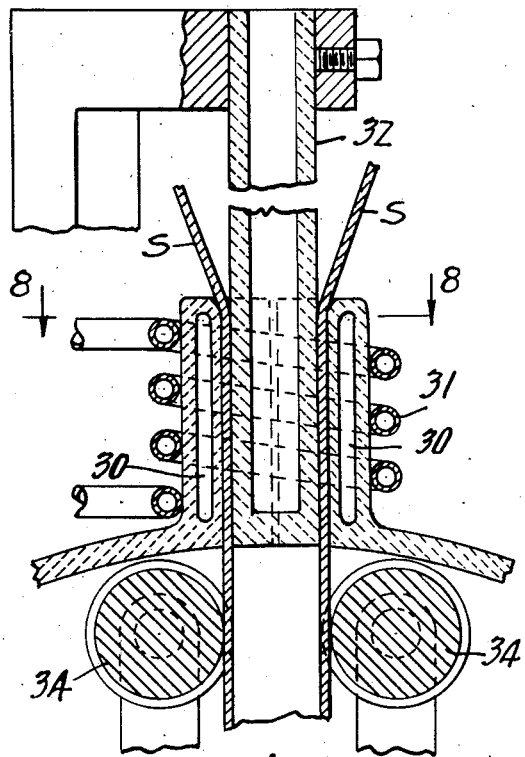
Fig. 7 is a vertical cross-section view of an apparatus for welding together a plurality of flat metal strips to form tubing of polygonal or other cross-section.
Figure 8:
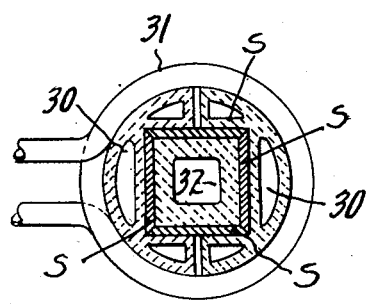
Fig. 8 is a cross-section view taken substantially along the line 8—8, Fig. 7, showing the strips as brought together in edge-to-edge abutment for welding of the corners of the tube thus formed.

Instead of preforming the tube T from one or more flat metal strips, it is possible with my invention to bring together flat strips S preferably with scarfed edges as shown in Figs. 7 and 8. In this apparatus, there are clamp members 30, 30 of ceramic material such as $Al_2O_3$ surrounded by a high frequency water-cooled induction heating coil 31, and within said clamping assembly is a downwardly extending ceramic mandrel 32. In this particular case, the mandrel 32 is of square or rectangular cross-section, and four flat strips S, herein formed with preferably scarfed edges, are passed downwardly between the mandrel 32 and the clamping assembly 30, 30 which serves to guide the strips S with their scarfed edges in abutment.

Because of the polygonal arrangement of the strip metal S, the corners thereof when brought together are located closer to the surrounding inductor coil 31 than are the remaining portions of the strips, whereby only the corners which are pressed together will be heated to welding temperature.

Again, as in the other forms of the invention herein disclosed, the pressing members 30, 30 and mandrel 32 are of hollow construction for circulation of cooling fluid such as water therethrough to extract heat from remote sections of the strips and thereby restrict the heating of the strips to the welding temperature to the very edges thereof which are welded together. The welded tube as thus formed from the four strips S is drawn longitudinally by suitable power-driven rolls 34, 34 engaged therewith. Obviously, the Figs. 7 and 8 apparatus may be disposed in a horizontal or in any other position.

Although square or rectangular tubing is shown as being produced by the Figs. 7-8 apparatus, it is to be understood that three strips S may be brought together to form triangular tubing, and five strips may be brought together to form pentagonal tubing, etc. If desired, the polygonal or other form of tube produced by the Figs. 7 and 8 apparatus may be drawn over a mandrel to change the cross-section shape to circular, oval, or other shape; and it is to be noted that by using strips having scarfed edges as shown in Fig. 8, the reshaping of the square tube or other polygonal tube to, say, circular form, will cause such scarfed edges to be disposed on a bias in the reformed tube, rather than strictly radial.

Figure 9:
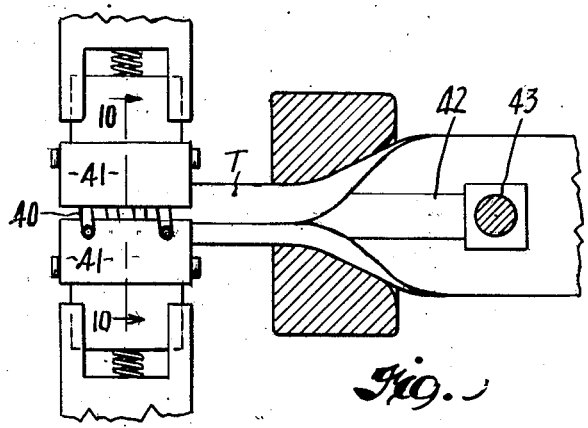
Fig. 9 is a top plan view of a tube welder which incorporates means for eliminating the weld bead or flash on both the inside and outside of the welded tube.
Figure 10:
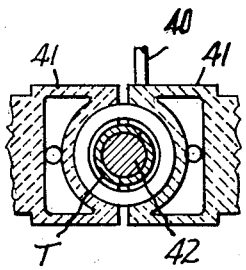
Fig. 10 is a cross-section view taken substantially along the line 10—10, Fig. 9.

In the apparatus illustrated in Figs. 9 and 10, a coil inductor 40 is employed in conjunction with helically grooved, opposed ceramic fluid-cooled clamp members 41, 41; and, although the heating current in this case flows circumferentially around the outer surface of the tube T, the outer surface is cooled by the opposite clamping or pressing members; and, furthermore, the welding current is nevertheless concentrated on the abutting seam edges.

A further feature of the Figs. 9 and 10 construction is the provision of shoes on the inside and outside of the welded seam to prevent forming of beads or flash. The inner shoe 42 extends rearwardly to a support 43 therefor. The outer shoe here is shown as consisting of one of the clamping or pressing members 41, the gap or joint between said members 41 being offset circumferentially from the abutting seam edges of the tube T.

Figure 11:
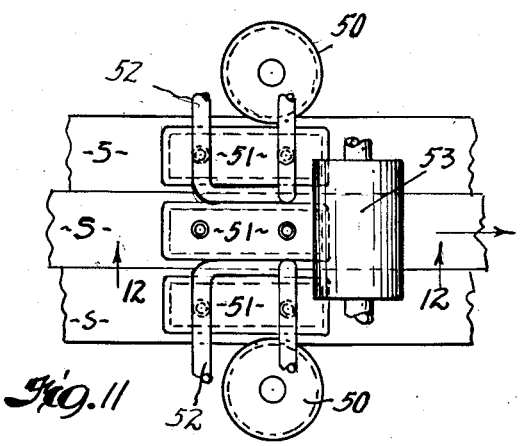
Fig. 11 is a top plan view of apparatus for welding together a plurality of metal strips in edge-to-edge relation.
Figure 12:
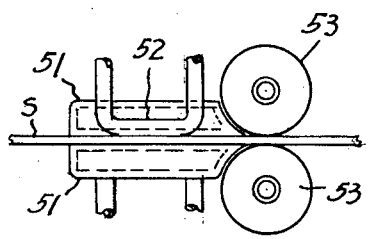
Fig. 12 is a cross-section view taken substantially along the line 12—12, Fig. 11.

In Figs. 11 and 12, there are shown three longitudinally traveling strips S disposed side by side and pressed into edge-to-edge engagement as by means of spaced apart rolls 50, 50 engaging the outer edges of the first and third strips S.

Slidably engaging the top and bottom surfaces of the respective strips are fluid-cooled shoes 51, and the seams between adjacent strips which are to be welded together have inductors 52 located thereabove and/or therebeneath to concentrate the heating current along the seam edges. Of course, the fluid-cooled shoes prevent heating up of the strips except for the edges thereof to be welded together.

Immediately after the seam edges have been welded together, the united strips S pass between suitable power-driven rolls 53, 53, preferably fluid-cooled, which serve to iron out the flash or burrs which may occur along the welded seams, and obviously other means may be employed for removing the flash. As is apparent, any number of strips may be thus welded together in edge-to-edge relation, and it is possible to join dissimilar metal strips such as aluminum, copper, and iron.

Figure 13:
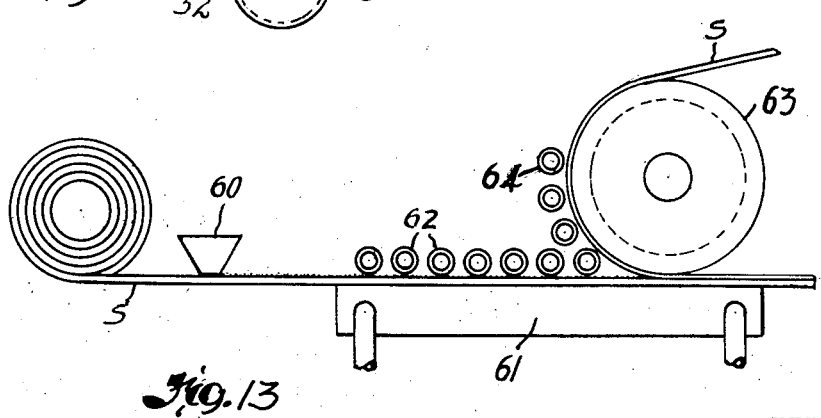
Fig. 13 is a side elevation view of an apparatus for applying and fusing metal particles to a metal strip according to the present invention.

Referring to Fig. 13, the strip metal S is drawn under a molten metal spray or dust applicator 60 which, in the case of a steel strip S, deposits a thin discrete particle layer of nickel dust thereon in discontinuous pattern. The strip S with the finely divided metal particles thereon is then passed over a cooling shoe 61 and beneath a series of high frequency coils 62 effective to fuse the metal particles onto the strip S.

While the face of the strip S and the particulate layer are in highly heated condition, a strip of metal S, as of bronze, is laminated thereto, the bronze strip passing over a water-cooled roll 63, and the outside face of the bronze strip is superficially heated to bonding temperature by a series of high frequency coils 64. The two strips of dissimilar metals are thus united by the intermediate nickel layer. A copper powder layer may be fused over the nickel lattice and bonded thereto and lead impregnated thereafter from a molten lead bath. The copper layer may be machined to accurate gauge prior to impregnation.

As evident, the cooling shoe 61 through which coolant such as water is adapted to be circulated, and the fluid-cooled roll 63 serve to maintain the respective strips which pass thereover in solid condition throughout substantially their entire thicknesses, and only the faces of the strip which are to be joined together are inductively heated to welding temperature by the high frequency inductors 62 and 64.

The application of the fired-in and fused discrete discontinuous nickel latticework is of great value in bonding dissimilar metal strips which do not ordinarily have a tendency to wet each other when molten, such as, for example, silver and steel, or copper and steel, or alloys thereof.

Referring further to Fig. 13, the strip S drawn from the coil at the left, may be of metal such as steel to which nickel powder is applied by the applicator 60, the steel strip S with the nickel powder layer thereon being passed under a heating means such as a high frequency inductor 62 to fuse the nickel particles onto the steel strip S as a nickel latticework, there being cooling means 61 underneath and in contact with the steel strip S so as to restrict heating thereof to only the top surface to which the nickel layer is fused.

Now, instead of bonding another metal strip S, as shown at the righthand side of Fig. 13, it is possible to provide another particulate metal applicator as shown in Fig. 3 of the above-referred-to copending application, Serial No. 44,305. Such other particulate metal applicator may be in the form of a metallizing gun for spray depositing a layer of metal which is to be bonded over the nickel latticework, whereafter the spray-deposited layer is heated as by another high frequency inductor similar to inductor 62 to bond the second applied metal to the steel strip S having the nickel layer thereon. Such bonding of the second metal layer may be assisted by water-cooled rolls pressing the composite assembly against a water-cooled table as is shown in said Fig. 3 of Serial No. 44,305. The base metal strip S may be pre-heated prior to applying and fusing the nickel particles thereto if desired.

Furthermore, molten metal can be applied to a heated surface of the metal strip, while the opposite surface of such metal strip is positively cooled. Thus, instead of using a metallizing gun or powder applicator in the case of the second metal layer, there could be provided a hopper in which molten metal is stored for application as a thin film or layer over the nickeled steel strip followed by passage between fluid-cooled rollers or between a fluid-cooled table and rollers.

Other modes of applying the principle of the invention may be employed, change being made as regards the details described, provided the features stated in any of the following claims, or the equivalent of such, be employed.

I therefore particularly point out and distinctly claim as my invention:

1. The method of continuously welding together a pair of bondable metal faces which comprises pressure contacting successive longitudinal sections of the faces to be welded together, moving successive longitudinal sections of the pressure contacted faces only past substantially the highest intensity portion of an induction heating field so as to only superficially heat successive longitudinal sections of the thus contacting faces to welding temperature, and, while so moving the metal faces past such heating field, ironing the adjacent surfaces to eliminate formation of a flash bead.

2. The method of continuously welding a tube seam which comprises the steps of pressure contacting successive longitudinal sections of the seam edges of the tube, moving successive longitudinal sections of the pressure contacted edges of the tube only past substantially the highest intensity portion of an induction heating field so as to only superficially heat successive longitudinal sections of the thus contacting edges to welding temperatures, and, while so moving such edges past such heating fields, ironing the adjacent surfaces to eliminate formation of a flash bead along the welded seam.

3. The method of continuously welding together a pair of bondable metal faces which comprises pressure contacting successive longitudinal sections of the faces to be welded together, providing an annular induction heating field, and moving successive longitudinal sections of the pressure contacted faces axially through such field with such faces closest to such field whereby the contacting faces only are heated to welding temperature.

4. The method of claim 3 wherein the faces that are pressure contacted and welded together are the edges of angularly related metal strips that extend generally chordwise of such heating field.

5. The method of claim 4 wherein several metal strips, thus angularly related with their edges in pressure contact are moved through such heating field to produce tubing of polygonal cross-section.

References Cited in the file of this patent

UNITED STATES PATENTS

| | | |
|---|---|---|
| 1,365,198 | Sessions | Jan. 11, 1921 |
| 1,365,199 | Sessions | Jan. 11, 1921 |
| 1,998,496 | Fiedler | Apr. 23, 1935 |
| 2,024,906 | Bennett | Dec. 17, 1935 |
| 2,290,338 | Koehring | July 21, 1942 |
| 2,460,687 | Fuchs | Feb. 1, 1949 |

FOREIGN PATENTS

| | | |
|---|---|---|
| 234,373 | Great Britain | May 28, 1925 |
| 255,846 | Switzerland | Jan. 17, 1949 |